United States Patent [11] 3,611,137

[72] Inventors Russell F. Graefnitz
Lafayette;
George N. Burkhart, Jr., Brookston, both of Ind.
[21] Appl. No. 840,263
[22] Filed July 9, 1969
[45] Patented Oct. 5, 1971
[73] Assignee Duncan Electric Company, Inc.
Lafayette, Ind.

[54] WATT-HOUR METER WITH SHIFTING-RELUCTANCE ACCURACY ADJUSTMENT
19 Claims, 14 Drawing Figs.

[52] U.S. Cl. .................................................. 324/138
[51] Int. Cl. ............................................. G01r 11/02
[50] Field of Search .......................................... 324/137, 138

[56] References Cited
FOREIGN PATENTS
664,238  6/1963  Canada .................... 324/138

*Primary Examiner*—Alfred E. Smith
*Attorney*—Darbo, Robertson & Vandenburgh

ABSTRACT: A watt-hour meter for alternating current is adjusted for accuracy of measurement of light loads, and for accuracy of phasing. The former shiftable plate is replaced by a fixed plate combined with means for varying the current flow therein between different paths oppositely displaced from center, and independently as a total for phasing. The first current-varying means includes a loading coil connected in series with each of oppositely displaced paths. A magnetic core can be shifted between loading coils with opposite effects on the oppositely displaced paths while the total current remains approximately constant. The adjustment is by a screw having its head accessible from the front of the meter and provided with backlash prevention. The fixed plate advantageously has narrow portions serving as spacers in the potential magnet stack. A stainless steel strip forming a passageway for a balance screw is extended to provide relative insulation for, and to retain, each of the spacer portions.

PATENTED OCT 5 1971
3,611,137
SHEET 1 OF 2
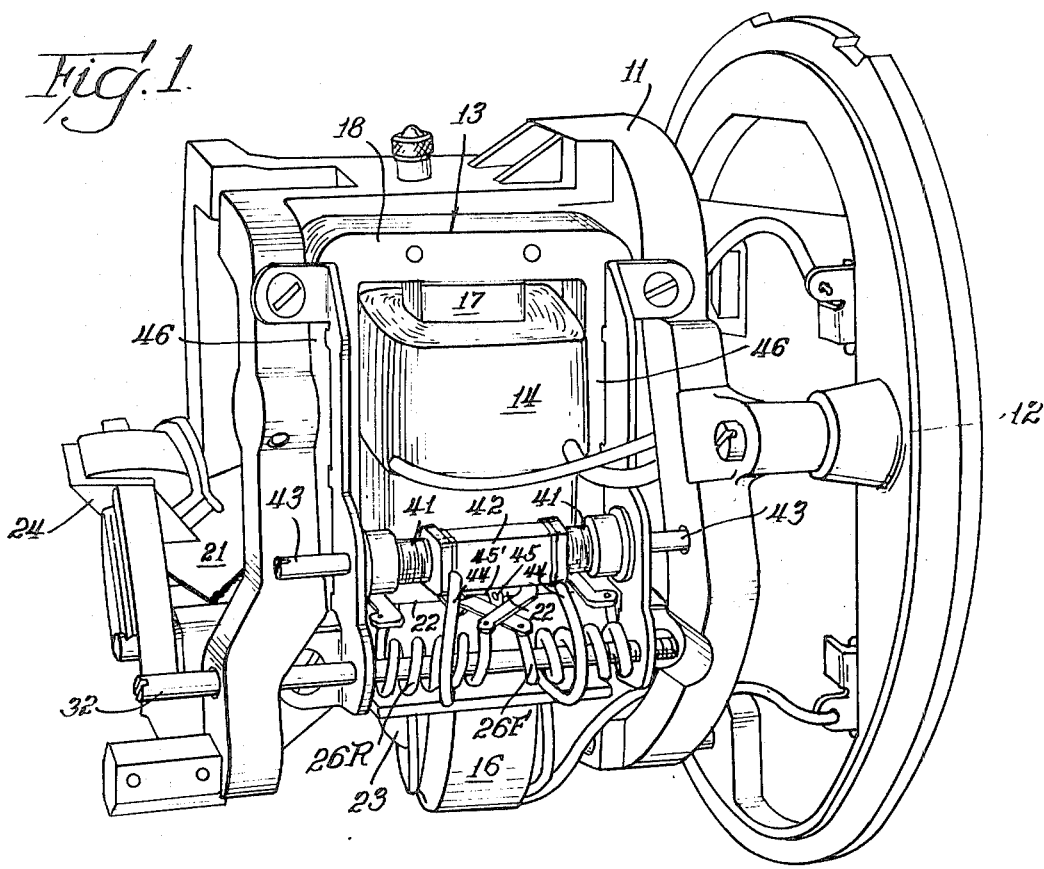
Fig. 1.
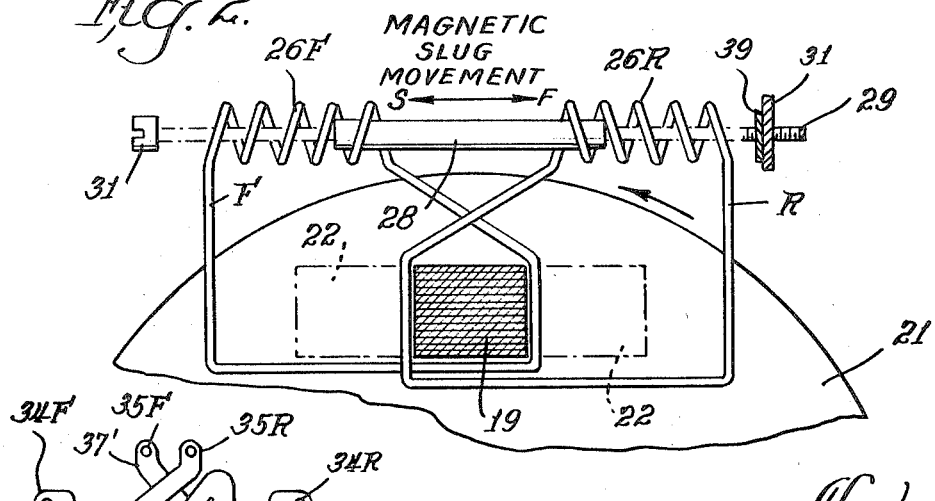
Fig. 2.
Fig. 3.
Inventors
Russell F. Graefnitz
George N. Burkhart, Jr.
By Darbo, Robertson & Vandenburgh Att'ys

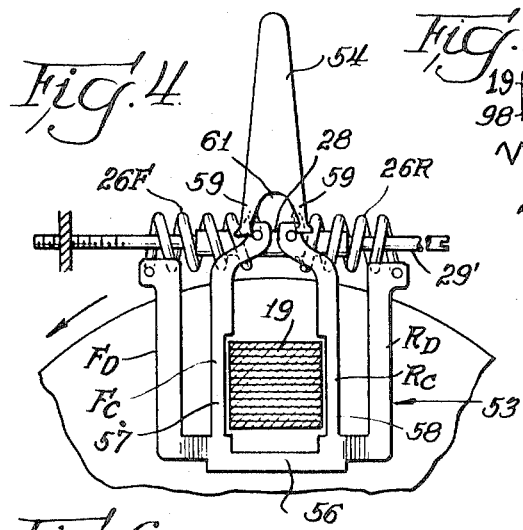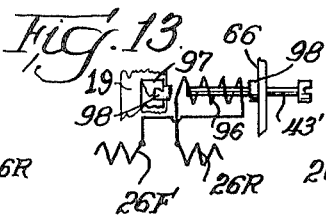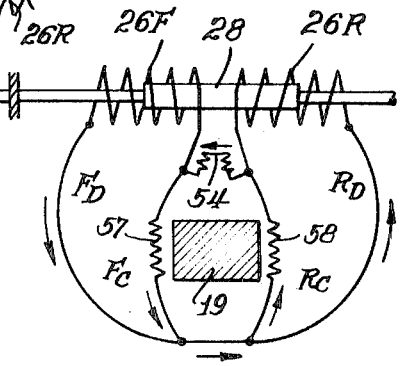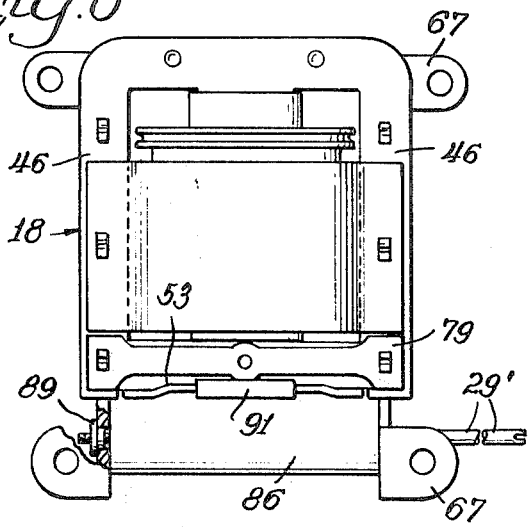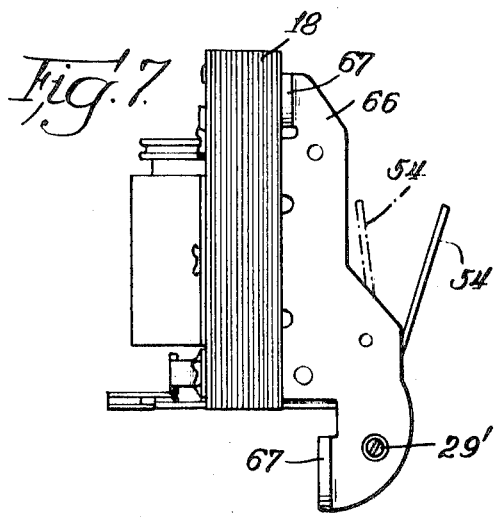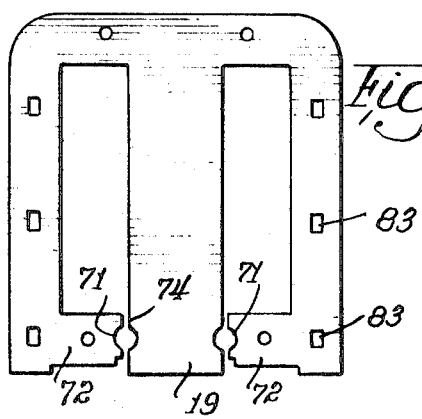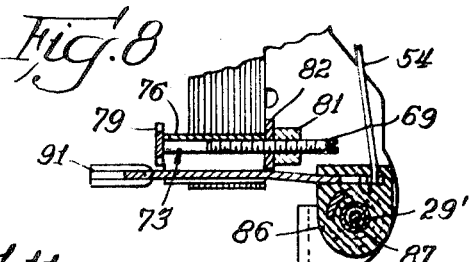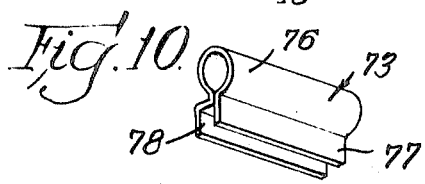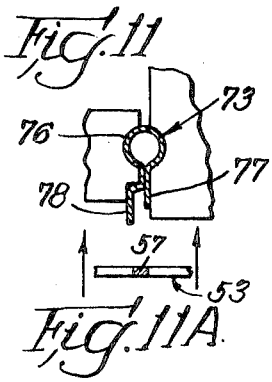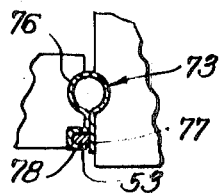

WATT-HOUR METER WITH SHIFTING-RELUCTANCE ACCURACY ADJUSTMENT

INTRODUCTION

The invention of which this disclosure is offered for public dissemination in the event adequate patent protection is available relates to improved accuracy adjustment in watt-hour meters, particularly the light load adjustment. Watt-hour meters are the type of meter familiarly known to home owners as the electricity meter. Such meters have long been provided with various adjustment devices for achieving greater accuracy than would otherwise be possible.

One class of adjustment devices for such watt-hour meters is that known as the light load adjustment. Meters naturally tend to need light load compensation. The need for such compensation can be recognized by realizing that the magnetization curve of the laminations forming part of a meter is not a straight line. Meter accuracy requires compensation for the droop of the curve at low values. The light load compensation may add a minute force developed entirely by the line voltage so that it is present at all times for aiding in the driving of the disk when the part of the force derived from the current in the circuit being measured is extremely low. If the design includes some offsetting factors for this droop, exact prediction of the equality between the offsetting factors and the need for compensation is impossible, and therefore some compensation must be adjustable. In a meter well designed as to offsetting factors, the adjustable compensation may be needed in either direction.

For many years, the light load adjustment in such meters has involved physically shifting a "light load plate." Typically, this plate formed a conductive loop around the main pole of the potential driving magnet adjacent the meter disk. Many inventions concerned with light load plates have been made, particularly with respect to the means for moving them, one example being found in Green's U.S. Pat. No. 2,167,649.

According to the present invention, a light load conductive means is completely stationary. Two controlled conductive paths are provided, one being displaced forwardly and corresponding to moving the movable light load compensator forwardly; the other being displaced rearwardly and corresponding to moving the movable light load compensator rearwardly. If these two paths are equally displaced from center, and if they carried currents of equal magnitude and alike in phase, they would offset one another directionally. This would correspond to a centered adjustment of the movable light load compensating loop or plate. However, the currents in the two paths are inversely changed by providing a loading coil in series with each path, the impedance of the two loading coils being differentially adjusted by moving a magnetic core into one coil and out from the other. With the magnetic core balanced as to the two paths, the currents would be equal. Moving the core in one direction would reduce the impedance of the coil in the forward-driving path thus increasing the magnitude and changing phase displacement of current in that path for producing forward light load compensating drive, while increasing the impedance of the other path thereby decreasing the current and changing phase displacement in the path with rearward drive effect. The two paths are parts of one or more loops surrounding the voltage pole. The vector sum of the current conditions around the voltage pole would remain substantially constant. This is very desirable because the total phase shifting effect must remain constant so as not to make the meter inaccurate.

The adjustment core is preferably shifted by screw means for delicacy of adjustment. Preferably, the magnetic core is a part of a screw which comprises the only moving part. Then the substantial elimination of backlash from such an adjustment is a simple matter. Also, it is easy to locate the screwdriver-slotted head of the screw at a convenient location for maximum simplification of the accuracy-adjustment of the meter in the final stages of manufacture known as calibration.

Additional objects and advantages of the invention will be apparent from the following description and from the drawings.

DESIGNATION OF FIGURES

FIG. 1 is a side view of a meter chosen for illustration of the present invention;

FIG. 2 is a diagrammatic illustration of the light load adjustment features provided in the meter of FIG. 1;

FIG. 3 is a plan view of the light load compensating plate which provides the main part of the two loops shown in FIG. 2 and the four terminals to which the coils shown in FIG. 2 are connected;

FIGS. 4 to 14 relate to a modification, FIG. 4 being a face view of the plate and showing other parts somewhat out of place for illustrative clarity;

FIG. 5 is a circuit diagram of the structure in FIG. 4;

FIGS. 6, 7 and 8 are face, side and sectional views of a preferred structure embodying the structure of FIG. 4;

FIG. 9 is a face view of a stack of voltage laminations;

FIG. 10 is a perspective view of an insert for the stack of FIG. 9;

FIGS. 11 and 11A are enlarged views showing the insert of FIG. 10 in place, and the plate of FIG. 4 about to have a portion thereof pressed into place.

FIG. 12 is a similar view, showing said portion in place and secured.

FIG. 13 is a fragmentary schematic view of a modification for phasing adjustment.

INTENT CLAUSE

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

DESCRIPTION OF METER

The meter illustrated in FIG. 1 is a two-element meter including a frame 11 conventionally made of aluminum and which is carried by a base plate 12. The frame 11 carries two electromagnetic driving elements 13, one of which is seen in FIG. 1. The driving element 13 includes a voltage or potential coil 14 which is connected between two of the conductors of the circuit being measured and a current coil 16 which is connected in series with one of the conductors of the circuit being measured The voltage coil 14 is mounted on the center leg 17 of a core structure 18, this center leg terminating at a bottom pole portion 19 seen in FIG. 2. A disk 21, shown partially, is rotatably carried by the frame 11 to rotate through a gap formed in part by the pole piece 19. Below the disk are the current poles 22 forming the upper ends of current core 23 on which the current coil 16 is wound. The poles 19 and 22 induce eddy currents in the disk 21 and these eddy currents magnetically coact with the fields present from the poles 19 and 22 to drive the disk 21 in the forward direction.

Since the potential coil 14 is connected between two of the circuit conductors, it is continuously energized, its energization varying only by the slight amount which the voltage of the circuit being measured varies. If the circuit being measured is idle, no current passes through the coil 16. Of course, there usually is some current through the coil 16, representing the current in the circuit conductor to which it is connected. Thus there is a voltage flux emanating from pole 19 to cut the disk 21. This flux is as constant as is the voltages, but the current flux passing through the disk from one of the poles 22 to the other is in general proportional to the current value in the connected circuit conductor. Assuming a constant voltage, the driving force of the driving element 13 on the disk is therefore proportional (except for the linearity problem mentioned) to the current in the conductor to which the coil 16 is connected. A retarding magnet 24, commonly called a damping magnet, provides an intense constant magnetic field through which the disk passes, producing on the disk a retarding force proportional to the speed of the disk. The result, with various compensations, is that the speed of the disk 21 is proportional to the power consumption. In other words, the disk makes a given number of turns for each kilowatt hour of electrical energy used. Of course, a meter register, not showing, is geared to the disk to be advanced by it one kilowatt hour for each of said number of turns.

LIGHT LOAD ADJUSTMENT OF THE PRESENT INVENTION

The light load adjustment of a simple form of the present invention is best explained with reference to the diagrammatic FIG. 2. Two separate loops "F" and "R" surround the pole 19 but extend away from it. The loop "F" extends or is displaced in a forward direction and the loop "R" extends or is displaced in the rearward direction. The loop "F" includes a coil 26F and the loop "R" includes a coil 26R, which may be jointly referred to as coils 26. Each loop is formed of metal of high conductivity, typically copper. Each loop is inductively energized by the alternating flux passing through pole 19. Each of the coils 26 serves as a loading coil determining the amount and more especially the phase position of the current which will pass through the loop as a result of the voltage induced by the alternating flux mentioned.

If only loop "F" were present, and with no current in current coil 16, the flux emanated by loop "F," being out of phase with the flux of pole 19 and displaced from it, would react with the flux 19 or its eddy currents in the disk to create a driving force on the disk in one direction which we may assume to be the forward direction. With only the loop "R" present, the effect would be the opposite with a driving force in the rearward direction. With both loops present, and assuming them to be alike in all respects including the impedance of coils 26, there would be equal currents through them with opposite and equal driving forces exerted on disk 21 producing a net driving force of zero. With the twin oppositely displaced loops so far described, light load compensation and adjustment can very advantageously be achieved by providing a magnetic core member 28 movable in either direction as by mounting it on screw 29 threaded into a rigid member 31, and which can be turned by inserting a screwdriver from the front of the meter into a slot 32. The magnetic core 28 will greatly increase the inductance or impedance of either coil 26F or 26R when it is moved to lie entirely within such coil. When it extends equally into each coil, as seen in FIG. 2, it provides equal inductance in the two coils and hence makes the two loop currents equal. By moving the core 28 to the right as seen in FIG. 2, it would increase the inductance of coil 26R and decrease it in 26F. This would result in increasing the current and changing its phase displacement in loop "F" and producing the opposite effect in loop "R." This would increase the forward driving effect of loop "F" and decrease the reverse driving force of loop "R." It is clear, therefore, that such movement of the core 28 provides adjustment of light load compensation.

Ideally, a length is chosen for the core 28, such that with the desired range of adjustment from its midposition, (extending an equal amount into each of the coils 26F and 26R) there will be excellent linearity of adjustment while keeping the total current, in the two loops, approximately constant at all times. The latter requires that within the expectable extremes of movement the changes of impedance should be equal but opposite for the two coils 26F and 26R. With linearity of adjustment, successive turns of screw 29 add or subtract equal increments to the compensating or driving force on disk 21.

If a basic meter design is more likely to need forward compensation than rearward, plate 33 could, so far as this compensation is concerned, be nonsymmetric. For example, the reverse loop "R" could be centered just enough off center so that movement of core 28 to the position giving maximum current through loop "R" would give only enough reverse drive to bring the net forward light load compensation to the expectable minimum need, with a safe margin. However, the illustrated symmetry is greatly preferred to avoid introducing problems that can result from physical dissymmetry and because of a high degree of certainty that adjustment of the light load will not cause phasing inaccuracies.

Although plate 33 has one conductive portion common to the two loops, the loops function separately nevertheless. Coils 26F and 26R are preferably oppositely wound, to produce opposing fluxes in core 28, for minimum detraction from the differential effects by mutual magnetic coupling of the two coils.

STRUCTURAL FEATURES

The twin loops of this form of the invention can be provided in a very simple manner by providing a light load plate 33 as seen in FIG. 3, this light load plate having four terminals 34R, 35R and 34F and 35F. The two "F" terminals are connected, as by silver soldering, to coil 26F and the two "R" terminals are similarly connected to the coil 26R. Dotted lines 37 in FIG. 3 shown the shape in which the plate 33 is initially stamped from sheet copper, the portion 37 being subsequently folded to the position 37' shown in full lines, leading to terminal 35R, but being slightly spaced from the lead to terminal 35F.

Any antibacklash feature may be provided for screw 29. One form is a threaded leaf-spring 39, which exerts a biasing force on screw 29 with respect to the rigid threaded member 31.

The screw unit, comprising screw 29 and core sleeve 28, can be of uniform diameter, except the threaded portion, as seen in FIG. 1. Thus, screw 29 may be formed of a nonmagnetic metal, for example, brass or nonmagnetic stainless steel. In one form it may be turned down to receive a pressed-on sleeve (core 28) of magnetic metal substantially nonretentive, having the same O.D. as the larger screw portion to provide a continuous outer surface. The end of the turned down portion is threaded. A simpler form is described in connection with FIGS. 4 to 12.

The coils 26F and 26R may be embedded in nonmagnetic insulating material, as by molding, with an axial hole therethrough for the screw unit. Additional parts of the assembly, as the terminals 34F and R and 35F and R may be encompassed within the molded piece to impart overall rigidity. Unless the core 28 fits the hole with enough snugness to prevent vibration, it is preferably coated with silicone grease or other suitable constant viscosity material to cling between it and the inside wall of the hole.

PHASE DISPLACEMENT ADJUSTMENT FOR LOW POWER FACTOR

FIG. 1 also illustrates a novel phase displacement adjustment device which may be the subject of a separate application. It effects phase displacement more at low power factors than at unity power factor and hence permits selective adjustment. Coils 41 on spool 42 are adjustably energized by screws 43 of substantially nonretentive magnetic metal. The coils 41 are connected by lead wires 44 to a compensating coil 45, mounted at the base of a tongue 45', forming part of the return path for flux, emanating from pole 19, that passes through disk 21. The coils 41 are connected in bucking relationship to the compensating coil. The coils 41 are energized by leakage flux between central leg 17 of the voltage core 18 and its side legs 46. Greater penetration of magnetic screws 43 into coils 41, which is at the same time closer approach of magnetic screws 43 to center core leg 17, or to a magnetic extension from it, increases the energization of coils 41. The effect of coils 41 and hence of individual screws 43 is essentially additive and it is unnecessary to have the screws equally entered in their respective coils.

It is difficult, and needless, to explain all of the coactions that account for the good phasing action achieved. The screws 43 alone, by changing the inductance to resistance ratio affecting coil 14, accomplish phase displacement, but at the cost of loss of torque. However, the coil 45 serves as a compensating coil, energized increasingly as screws 43 are screwed into coils 41. With the screws in their outermost positions, the current in coil 45 is substantially zero.

Although such adjustments may act to produce in addition to their intended action an incidental small net change of the registration of the meter at unity power factor, this is inconsequential. Any such effect is overcome by the light load and full load adjustments which are normally made after this phase displacement adjustment, although they could be made at the same time, with calculation as to cross effects.

CONTROLLED-DIVERSION FORM

FIGS. 4 to 12 illustrate a perhaps more sophisticated form of the invention. FIG. 4 shows the actual face view of the plate now to be used, the coils 26F and 26R being slightly displaced from their presently intended positions, although shown accurately from the standpoint of their connections. Although the plate 53 of this form looks very similar to the plate 33 of FIG. 3, there is a distinct difference in that the inner or closer legs $F_c$ and $R_C$ are not crossed over one another, there being no such portion as 37' of FIG. 3. Instead, these legs in FIG. 4 are connected together through a lag-adjustment plate 54. It follows that the two coils 26 and 26R are also connected in one circuit through lag-adjustment plate 54, instead of each being in its own separate circuit surrounding pole 19.

It may be easier to explain this circuitry with reference to FIG. 5 in which the circuits have been shown in a somewhat circular manner for greater ease in keeping in mind that the effect of alternating flux through pole 19 is to induce an alternating voltage in any conductive path surrounding this flux, and hence a current in one direction at a given instant. In the circuitry of the FIGS. 4 and 5, the currents flowing around pole 19 have two portions where all such currents merge and flow as one. One of these is through the lag-adjusting plate 54, the other is through the length of bar 56 at the opposite side of the circuitry from plate 54. In FIG. 5 arrows have been added to show the direction of current flow in the various components of the circuitry at a given instant, although in the next half cycle they would all be reversed. Furthermore, the phase-shifting effect of coils 26 is ignored, for the moment.

It should be observed that the leg $F_c$ has a reduced portion 57 and the leg $R_C$ has a reduced portion 58. These reduced portions serve as resistors, and are represented as resistors in FIG. 5. Although the entire plate 53 is of copper, the portions 57 and 58 are resistors (relatively) because of their reduced cross section. Likewise, the plate 54 has been represented in FIG. 5 as including two resistors, since the two legs 59 of this plate serve as resistors. Indeed, this plate 54 is a lag-adjustment plate because the slot 61 which separates the two legs 59 can be extended lengthwise of the plate 54 to increase the length of the legs 59 and hence increase the resistance, this increase applying to the entire circulating current in plate 53 around pole 19.

In FIGS. 4 and 5, the magnetic sleeve 28 has been shown in centered position, extending equally into both of the coils 26F and 26R. Accordingly, the circuitry is balanced and substantially the same current will flow through leg $F_c$ as flows through leg $R_c$ and substantially the same current through leg $F_D$ as through $R_D$.

When magnetic sleeve 28 is shifted to the left, this increases the inductance of coil 26F and decreases the inductance of coil 26R. Accordingly, the current through the displaced legs of differentially affected. Thus current through displaced leg $F_D$ would be further lagged, and the lag of the current in leg $R_D$ would be decreased. Since at any given instant, and considering at this time only the currents passing around pole 19, all of the current flowing through legs $F_D$ and $F_C$ must also flow through legs $R_C$ and $R_D$, it follows that at an instant when the current flow through leg $F_D$ is at its maximum, this will not (in view of the phase shifting) be the instant when the current through leg $R_D$ is at a maximum and therefore there will be an increased flow through leg $R_C$. In other words, a portion of the current in leg $F_C$ undergoes changes reflecting the change of current in leg $F_D$. Accordingly, leg $F_D$ and leg $R_C$ act to a considerable degree as if they were part of one separate loop as in FIGS. 2 and 3. Likewise, legs $R_D$ and $F_C$ act to a considerable degree as if they were a separate loop. Nevertheless, there is also an aspect of controlling the diversion of flow from the more central legs to the displaced legs, and hence this form of the invention can be called "controlled diversion."

Some of the light load adjustment may be independent of current flow around pole 19. Ignoring plate 54, coils 26R and 26F are in oppositely displaced side loops, one including $R_D$ and $R_C$, and the other $F_D$ and $F_C$.

There is no need, however, to have an exact explanation or analysis that the phase or current shifts which take place. It is quite apparent that shifting magnetic sleeve 28 will have opposite effects on currents in oppositely displaced elements (such as displaced legs or paths $F_D$ and $R_D$) and that this alone would account for increased or decreased driving effect, or even for a reversal of the driving effect if the movement of the sleeve 28 was far enough in one direction to cause reversal.

Looking at it another way, it is clear that the current flow through leg $R_D$ is directly controlled to some extent by coil 26R and that the current flow through leg $F_D$ is likewise directly controlled by coil 26F. The presence of resistances 57 and 58 causes enough of the total current to flow through these legs so that the effects of coils 26F and 26R can have a substantial effect on the driving forces applied to the disk. Changing the phase lag in leg $F_D$ while oppositely changing the phase lag in leg $R_D$ clearly has the desired effect. In FIG. 3 the control is of each complete circuit separately, (though oppositely) and in FIG. 5 there is a more complex control in that the changes effected as to legs $F_D$ and $R_D$ are necessarily reflected by changes occurring also in legs $F_C$ and $R_C$.

CONSTRUCTION FEATURES—FIGS. 6 to 12

The light load and lag plate of FIG. 4 lends itself to some advantageous constructional features illustrated in FIGS. 6 to 12.

As seen in FIGS. 6 and 7, the laminations of core 18 are firmly secured together and to mounting brackets 66 having mounting ears 67.

For polyphase meters, when there will be at least two driving elements driving the rotor or disk 21, it is desirable to balance the driving torques of the two elements. One way to do so is to provide balance screws 69 seen best in FIG. 8. These balance screws extend adjustably into gaps 71 lying between pole 19 and flux return arms 72. Accuracy of the length of this gap-spacing, especially at the narrow portions such as 74, is important. According to a constructional feature of the present invention, the resistor portions 57 and 58 of plate 53, being of reduced cross section, are used as spacers for insuring accuracy of the gap dimension, and at the same time are the parts by which the plate 53 is held in position, a pair of inserts 73 receiving the portions 57 and 58 and thus holding lag plate 53 in place. Each insert 73 serves also for insulting its member 57 or 58 (relatively) and for forming a smooth passage for adjustment screw 69, as described below.

The insert 73 is a thin sheet of high-resistance nonmagnetic stainless steel shaped to provide a portion 76 following a cylindrical contour, a straight flange 77 and a stepped flange 78 extending outwardly therefrom. During assembly, this insert 73 is slipped through the gap 71, assuming the position shown on an enlarged scale in FIG. 11. Strap 79 is a conventional voltage compensator part which may be secured to the stack of laminations as if it were another lamination, by rivet means extending through the laminations and through it. It may be mentioned that at present it is preferred that the rivet means be in the form of fingers extending integrally from the brackets 66, slipped through the apertures 83 and, while the parts are held under pressure, staked. Bar 81 (which bridges the gaps 71 similarly to strap 79) may be similarly secured to brackets 66 by its own staked extensions. The portion 76 of cylindrical contour (a portion of insert 73) forms a smooth housing which insures smooth entry of balancing screw 69 into the gap 71. The flanges 77 and 78 serve to insulate and secure the copper resistors 57 and 58, as seen best in FIGS. 11 and 12. FIG. 11 shows the insert 73 in place and ready to receive the light load plate 53. FIG. 11A shows the light load plate 53 in position about to be pressed into place.

FIG. 12 shows the light load plate 53 in place and secured both by its press fit and by the bending over of the edge of flange 78. Because the insert 73 is of stainless steel which is of much lower conductivity than copper, of which the plate 53 is made, the insert 73 serves to insulate the laminations from the copper and prevent a short circuiting of the laminations as to eddy currents.

Before applying the light load plate 53 as just described, a nylon insert 82 is slipped between the insert 73 and the bar 81. Bar 81 must be nonmagnetic, e.g. brass. Insert 82 serves primarily as an antibacklash feature for balancing screw 69, since it grips the threads of the screw resiliently. A space is provided for the insert 82 by notching the bar 81. Insert 82 should fit snugly enough not to move (especially not axially of the screw).

In FIG. 6, the light load plate 53 is seen, but not the coils 26. This is because the coils are shown embedded in a molded-in-situ plastic covering 86. A mere coating of the parts is now preferred, however, to give better visibility rearwardly. A tube 87 is inserted through the coils before the molding or coating operations. It is of thin-wall high-resistance nonmagnetic stainless steel, so that there is no substantial short circuiting of coils 26 even though it touches them, proper alignment of coils 26 being one of the purposes of tube 87. A threaded bushing 89 is secured at one end of tube 87, as in the adjacent bracket 66, and preferably grips the threads of screw 29 with antibacklash resiliency. For economy, it is now preferred to use a simple screw 29' with a sleeve 28 thereon, the opening in tube 87 being large enough to receive the sleeve 28 freely but snugly. This means that the shank of screw 29' is not snug fitting in tube 87, but there is no need for it to be. Assembly is extremely simple. The screw unit 28, 29' is simply inserted and screwed in. After passing through the bushing 89, the threads of screw 29' may be crimped to prevent accidental removal, but this is not deemed necessary. With a two-element meter in FIG. 1, one screw 29' would have right-hand threads and the other left-hand threads, so that clockwise turning would in each instance increase the light load compensating torque.

As seen in FIG. 7, lag-adjustment plate 54 extends upwardly and outwardly for easy access to it. After being slotted for making the phasing adjustment it may be bent into the out-of-the-way position shown in dotted lines.

Bar 56 of plate 53 is a convenient location for the usual temperature-compensating loop 91 seen best in FIG. 8.

PHASING ADJUSTMENT ACCORDING TO RECENT "BEST MODE CONTEMPLATED"

By substituting a phasing coil 96 of high conductivity wire in place of lag-adjustment plate 54, connecting this substituted phasing coil as plate 54 is connected as seen in FIG. 4 but locating the coil approximately along the axis of screw 43 of FIG. 1, the same plate 53 may be used for phasing adjustment, instead of coils 41 and their associated parts. Exceptionally good results have been achieved when this phasing coil has, adjustably extending through it, a magnetic metal screw 43' which derives flux from magnetic bracket 66 on one side and in its most penetrating position extends well into (without contacting) a small sleeve or partial sleeve 97 forming a magnetic extension from center pole 19. The direction of the winding of coil 96 should be such that the potential induced in it is generally opposed to the potential across it derived from plate 53. As the screw penetration is increased, the potential derived from the plate is exceeded and actual reversal of this current will occur before the screw reaches its operating range. A satisfactory degree of straight line characteristics is obtained by having the screw advance toward the magnetic part-sleeve 97 during about three-quarters of its movement, and in the remainder advance progressively into the magnetic sleeve with constant spacing between the sleeve and screw, of about 0.010 inch. This spacing is ensured by moving the screw through a nonmagnetic guide sleeve 98, largely broken away in FIG. 13. extending into the magnetic sleeve. The magnetic sleeve now preferred is not completely closed about the guide sleeve, about 120° being left open, with a tip bent over the end of the guide sleeve to lock it axially.

Acknowledgment is made of a suggestion made by a former coworker as a branch departure from an earlier version of phasing control, disclosed to him by a present applicant, for deriving voltage from a coil around the central leg of a potential magnet to power a very differently situated phasing coil, with adjustment by varying resistance. Because of remoteness of subject matter and the belief that this suggestion did not in fact lead to the present invention, and on advice of counsel, the coworker is not named as a coinventor.

ACHIEVEMENT

The light load adjustment of the present invention is highly desirable because of its extreme simplicity as well as its dependable accuracy and high uniformity (linearity) of adjustment over an ample range. The conductive loops have no moving parts and hence are mounted rigidly in the meter assembly. There is only one moving part in the light load adjustment, namely the unitary assembly of core 28 and screw 29 or 29', and it is mounted with the utmost simplicity, being just inserted and screwed into place.

Good linear adjustment has been achieved with all of the illustrated forms. Thus with each, there is good uniformity in the amount of change in the driving force resulting from successive turns of the screw 29, or equal movements of magnetic sleeve 28. There is, in fact, extremely good linearity for a range of adjustment of about 30 percent of the light load torque of the driving element. This is a safe margin beyond the range of adjustment expected to be used.

The very simple type of adjustment of this invention is based on the principle of using movement of a single screw unit, all other parts related to this adjustment being stationary, and the adjustment utilizing inductive coaction between a magnetic core and a surrounding conductive path. This principle can be used in various ways and these may include adjustments other than light load, such as the phasing adjustment of FIG. 13.

The light load plate of the figures, when the phasing adjustment of FIG. 13 is added to it, provides exceedingly simple and satisfactory good-linearity adjustment of both light load and phasing, with a high degree of independence between them.

I claim:

1. A watt-hour meter for alternating current including a rotatable disk and driving magnet means for the disk including a potential core having a main pole facing the disk and a potential coil on the core for energizing the core, and a current core having poles facing the disk in positions to cooperate with the main potential pole in driving the disk;

light load adjustment means including conductive loop means inductively coupled to the main potential pole and including conductive paths extending away therefrom in opposite directions one rearwardly and one forwardly with respect to disk rotation, and control coil controlling each path, and magnetic core means for said coils movable differentially with respect to said coils for light load adjustment, a given movement of said core means increasing the impedance of one of the coils while decreasing the impedance of the other of the coils, thereby altering the current in the paths oppositely while maintaining the total current of the loop means approximately constant.

2. A watt-hour meter for alternating current including a rotatable disk and driving magnet means for the disk including a potential core having a main pole facing the disk and a potential coil on the core for energizing the core, and a current core having poles facing the disk in positions to cooperate with the main potential pole in driving the disk;

light load adjustment means including conductive loop means inductively coupled to the main potential pole and including conductive paths differentially located with respect to disk rotation, and a control coil controlling each path;

and magnetic core means for said coils movable differentially with respect to said coils for light load adjustment, a given movement of said core means increasing the impedance of one of the coils while decreasing the impedance of the other of the coils, thereby altering the current in the paths oppositely while maintaining the total current of the loop means approximately constant.

3. A watt-hour meter for alternating current including a rotatable disk and driving magnet means for the disk including a potential core having a main pole facing the disk and a potential coil on the core for energizing the core, and a current core having poles facing the disk in positions to cooperate with the main potential pole in driving the disk;

light load adjustment means including conductive loop means inductively coupled to the main potential pole and including conductive paths extending away therefrom in opposite directions one rearwardly and one forwardly with respect to disk rotation, and a control coil controlling each path, and magnetic core means for said coils movable differentially with respect to said coils for light load adjustment, a given movement of said core means increasing the impedance of one of the coils while decreasing the impedance of the other of the coils, thereby altering the current in the paths oppositely.

4. A watt-hour meter for alternating current including a rotatable disk and driving magnet means for the disk including a potential core having a main pole facing the disk and a potential coil on the core for energizing the core, and a current core having poles facing the disk in positions to cooperate with the main potential pole in driving the disk;

light load adjustment means including conductive loop means inductively coupled to the main potential pole and including conductive paths differentially located with respect to disk rotation, and a control coil controlling each path;

and magnetic core means for said coils movable differentially with respect to said coils for light load adjustment, a given movement of said core means increasing the impedance of one of the coils while decreasing the impedance of the other of the coils, thereby altering the current in the paths oppositely.

5. A watt-hour meter for alternating current including a rotatable disk and driving magnet means for the disk including a potential core having a main pole facing the disk and a potential coil on the core for energizing the core, and a current core having poles facing the disk in positions to cooperate with the main potential pole in driving the disk;

light load adjustment means including conductive loop means inductively coupled to the main potential pole and including conductive paths extending away therefrom in opposite directions one rearwardly and one forwardly with respect to disk rotation, and a control coil controlling each path, and magnetic core means for said coils movable differentially with respect to said coils for light load adjustment, a given movement of said core means increasing the impedance of one of the coils while decreasing the impedance of the other of the coils, thereby altering the current in the paths oppositely; said core means comprising a magnetic sleeve firmly mounted on a nonmagnetic screw extending through said coils and having a threaded engagement with a support member.

6. A watt-hour meter for alternating current including a rotatable disk and driving magnet means for the disk including a potential core having a main pole facing the disk and a potential coil on the core for energizing the core, and a current core having poles facing the disk in positions to cooperate with the main potential pole in driving the disk;

light load adjustment means including conductive loop means inductively coupled to the main potential pole and including conductive paths extending away therefrom in opposite directions one rearwardly and one forwardly with respect to disk rotation, and a control coil controlling each path, and magnetic core means for said coils movable differentially with respect to said coils for light load adjustment, a given movement of said core means increasing the impedance of one of the coils while decreasing the impedance of the other of the coils, thereby altering the current in the loops oppositely; said core means comprising a magnetic sleeve firmly mounted on a nonmagnetic screw, forming a unitary screw assembly which extends through one support member with a snug fit, and has a threaded engagement with another support member.

7. A watt-hour meter for alternating current including a rotatable disk and driving magnet means for the disk including a potential core having a main pole facing the disk and a potential coil on the core for energizing the core, and a current core having poles facing the disk in positions to cooperate with the main potential pole in driving the disk;

light load adjustment means including conductive loop means inductively coupled to the main potential pole and including conductive paths extending away therefrom in opposite directions one rearwardly and one forwardly with respect to disk rotation, and a control coil controlling each path, said coils being aligned axially and having a unitary magnetic core means extending into both coils and movable axially with respect to said coils for light load adjustment, a given movement of said core means increasing the impedance of one of the coils while decreasing the impedance of the other of the coils, thereby altering the current in the paths oppositely while maintaining the total current of the two paths approximately constant.

8. A driving unit for a watt-hour meter including a voltage electromagnet having a magnetic core with side portions spaced magnetically near opposite sides of, and of opposite polarity to, a central leg pole having a face forming one side of a disk-receiving gap, and a current magnet having a core having two poles displaced laterally in opposite directions from the center of the first pole and having faces also facing the disk-receiving gap; characterized by an adjustment means for improving the accuracy of said driving unit comprising a screw unit and mounting means in which the screw unit screws for axial movement; said screw unit having a magnetic axially extending portion; said adjustment means including conductive means surrounding the magnetic portion of the screw unit and inductively affected by it, and all of the adjustment means not part of a screw unit being fixedly secured.

9. A driving unit for a watt-hour meter including a voltage electromagnet having a magnetic core with side portions spaced magnetically near opposite sides of, and of opposite polarity to, a central leg pole having a face forming one side of a disk-receiving gap, and a current magnet having a core having two poles displaced laterally in opposite directions from the center of the first pole and having faces also facing the disk-receiving gap; characterized by a light load adjustment means comprising a screw unit and mounting means in which the screw unit screws for axial movement; said screw unit having a magnetic axially extending portion; said adjustment means including conductive means surrounding the magnetic portion and inductively affected by it, the shifting of the screw unit oppositely affecting the two sides of the driving unit while maintaining approximately constant the total amount of its inductive effect on the conductive means; and all of the adjustment means not part of a screw unit being fixedly secured.

10. A watt-hour meter for alternating current including a rotatable disk and driving magnet for the disk including a potential core having a main pole facing the disk and a potential coil on the core for energizing the core, and a current core having poles facing the disk in positions to cooperate with the main potential pole in driving the disk;

light load adjustment means including a conductive plate forming two loops surrounding the main potential pole and extending away therefrom in opposite directions one rearwardly and one forwardly with respect to disk rotation, and a control coil connected in series in each path, said coils being aligned axially and having a unitary magnetic core means extending into both coils and movable axially with respect to said coils for light load adjustment, a given movement of said core means increasing the impedance of one of the coils while decreasing the impedance of the other of the coils, thereby altering the current in the loops oppositely while maintaining the total current of the two loops approximately constant.

11. A watt-hour meter for alternating current including a rotatable disk and driving magnet means for the disk including a potential core having a main pole facing the disk and a potential coil on the core for energizing the core, and a current core having poles facing the disk in positions to cooperate with the main potential pole in driving the disk;

light load adjustment means including a conductive plate the main potential pole and including circuit branches on opposite dies of the pole inductively coupled to it, with one displaced branch on each side extending away from the pole, one rearwardly and one forwardly with respect to disk rotation, and a control coil controlling each displaced branch, said coils being aligned axially and having a unitary magnetic core means extending into both coils and movable axially with respect to said coils for light load adjustment, a given movement of said core means increasing the impedance of one of the coils while decreasing the impedance of the other of the coils, thereby altering the current in the displaced branches oppositely while maintaining the total current circulating through the plate approximately constant.

12. A watt-hour meter for alternating current including a rotatable disk and driving magnet means for the disk including a potential core having a main pole facing the disk and a potential coil on the core for energizing the core, a current core having poles facing the disk in positions to cooperate with the main potential pole in driving the disk; and a conductive lag-loop surrounding said main potential pole;

light load adjustment means including additional conductive loop means inductively coupled to the main potential pole and including conductive paths extending away therefrom in opposite directions one rearwardly and one forwardly with respect to disk rotation, and a control coil controlling each path, and magnetic core means for said coils movable differentially with respect to said coils for light load adjustment, a given movement of said core means increasing the impedance of one of the coils while decreasing the impedance of the other of the coils, thereby altering the current in the paths oppositely while maintaining the total current of the loop means approximately constant, said lag-loop being fixedly secured.

13. A watt-hour meter for alternating current including a rotatable disk and driving magnet means for the disk including a potential core having a main pole facing the disk and a potential coil on the core for energizing the core, a current core having poles facing the disk in positions to cooperate with the main potential pole in driving the disk, and a conductive lag-plate extending around said main potential pole; said driving magnet means also including light load adjustment means including conductive loop means inductively coupled to the main potential pole and including conductive paths extending away therefrom in opposite directions one rearwardly and one forwardly with respect to disk rotation, and a control coil controlling each path, and magnetic core means for said coils movable differentially with respect to said coils for light load adjustment, a given movement of said core means increasing the impedance of one of the coils while decreasing the impedance of the other of the coils, thereby altering the current in the paths oppositely while maintaining the total current of the loop means approximately constant, said lag-plate having means for altering the total current of the loop for phasing adjustment relatively independent of light load adjustment.

14. A watt-hour meter for alternating current including a rotatable disk and driving magnet means for the disk including a potential core having a main pole facing the disk and a potential coil on the core for energizing the core, a current core having poles facing the disk in positions to cooperate with the main potential pole in driving the disk, and a lag conductor surrounding flux of said main potential pole passing through the disk;

light load adjustment means including portions of the lag conductor forming conductive paths displaced from the main pole in opposite directions one rearwardly and one forwardly with respect to disk rotation, and a control coil controlling each path, and magnetic core means for said coils movable differentially with respect to said coils for light load adjustment, a given movement of said core means increasing the impedance of one of the coils while decreasing the impedance of the other of the coils, thereby altering the current in the paths oppositely while maintaining the total current of the lag conductor approximately unaffected, said lag conductor being fixedly secured, said lag conductor including phasing coil means connected in series with it, and phase adjustment means of magnetic material shiftable to vary its inductive coaction with said phasing coil means to vary the current flow in said plate, with substantially like effect on the forward and rearward portions thereof so as to have no more than minor effect as to light load adjustment.

15. The meter according to claim 14, in which the phasing coil means is so connected that all current in the lag conductor passing around the main potential pole must pass through it.

16. The meter according to claim 14, in which the phasing coil means is so connected that all current in the lag conductor passing around the main potential pole must pass through it; and in which the phase adjustment means forms a path of varying permeance through said phasing coil means and between said main pole and a magnetically opposite portion of the potential core.

17. The meter according to claim 14, in which the phasing coil means is so connected that all current in the lag conductor passing around the main potential pole must pass through it; and in which the phase adjustment means forms a path of varying permeance through said phasing coil means and between said main pole and a magnetically opposite portion of the potential core sufficient throughout its useful range to induce substantial flow of current around the main pole.

18. A watt-hour meter for alternating current including a rotatable disk and driving magnet means for the disk including a potential core having a main pole facing the disk and a potential coil on the core for energizing the core, a current core having poles facing the disk in positions to cooperate with the main potential pole in driving the disk, and a lag conductor surrounding flux of said main potential pole passing through the disk;

said lag conductor including phasing coil means connected in series with portions of it disposed in substantial symmetry as to opposite directions of disk rotation, and phase adjustment means of magnetic material shiftable to vary its inductive coaction with said phasing coil means to vary the current flow in said plate, with substantially like effect on the oppositely disposed portions thereof so as to have no more than minor effect as to light load adjustment.

19. The meter according to claim 18, in which the phase adjustment means forms a path of varying permeance through said phasing coil means and between said main pole and a magnetically opposite portion of the potential core sufficient to induce voltage to have a substantial effect on the flow of current in the lag conductor.

UNITED STATES PATENT OFFICE
CERTIFICATE OF CORRECTION

Patent No. 3,611,137          Dated Oct. 5, 1971

Inventor(s) Russell F. Graefnitz and George N. Burkhart, Jr.

It is certified that error appears in the above-identified patent and that said Letters Patent are hereby corrected as shown below:

Column 5, last line, "of" should be -- is -- .
Column 6, 10th line, before "undergoes", "$F_C$" should be -- $R_C$ -- .
Column 6, at about lines 68-69 (a word bridging the 2nd and 3rd lines from end of paragraph), "insulting" should be -- insulating -- .
Column 8, line 1, after "side" insert -- arm 45 -- .
Column 8, line 58 (1st line of paragraph), before "figures" insert -- other -- .
Column 10, in line at bottom of line number 60 (3rd line of subparagraph), after "movement" insert -- generally parallel to the core; --
In claim 10, 2nd line, after "magnet" insert -- means -- .
At the end of the 7th line of claim 11, insert -- forming a circuit around -- .
In the 8th line of claim 11 delete "circuit".
In the 9th line of claim 11 "dies" should be -- side -- ; and after "pole" delete the phrase "inductively coupled to it".

Signed and sealed this 11th day of July 1972.

(SEAL)
Attest:

EDWARD M. FLETCHER, JR.
Attesting Officer

ROBERT GOTTSCHALK
Commissioner of Patents